March 6, 1945. O. M. SUMMERS 2,371,078
RADIAL PUMP WITH TRUNNION MOUNTING OF SHIFT RING
Filed Sept. 14, 1942 2 Sheets-Sheet 1

INVENTOR
OTTO MURRAY SUMMERS,
BY
Toulmin & Toulmin
ATTORNEYS

March 6, 1945. O. M. SUMMERS 2,371,078
RADIAL PUMP WITH TRUNNION MOUNTING OF SHIFT RING
Filed Sept. 14, 1942 2 Sheets-Sheet 2

INVENTOR
OTTO MURRAY SUMMERS,
BY
Toulmin & Toulmin
ATTORNEYS

Patented Mar. 6, 1945

2,371,078

UNITED STATES PATENT OFFICE 2,371,078

RADIAL PUMP WITH TRUNNION MOUNTING OF SHIFT RING

Otto M. Summers, Mount Gilead, Ohio, assignor to The Hydraulic Development Corp., Mount Gilead, Ohio, a corporation of Delaware Application September 14, 1942, Serial No. 458,218

3 Claims. (Cl. 103—161)

This invention relates to pumps for producing fluid pressure, and particularly pumps of the type having a primary and a secondary rotor with radial pistons therebetween. The pumps may be of the variable delivery type having a one-way delivery, or may be of the reversible variable delivery type.

Heretofore, pumps of the variable delivery type that are constructed and arranged to produce relatively high fluid pressures became difficult to shift toward neutral position after they had been in use for sometime. In pumps of the type having a primary and secondary rotor it is conventional to use a shift ring for supporting the secondary rotor, and for moving the same relative to the primary rotor to change the output delivery of the pump. The shift ring has been provided with flat surfaces that slide upon flat surfaces provided on the pump housing when the ring is shifted by suitable control elements engaging the same. Considerable difficulty has occurred in maintaining proper parallelism between the flat surfaces on the housing and the shift ring during their manufacture because of the relatively large size of fluid pumps that are delivering large volumes of fluid. The flat surfaces are spaced apart from one another in parallel relation from about 5 inches to as much as 34 inches in the larger type pumps. The problem of maintaining accurate dimensions between the flat surfaces is also acute.

When fluid pumps are operated against relatively high fluid pressure, considerable heat is developed in the pump that is transmitted to the shift ring causing the same to expand. The pump body, of course, is exposed to the temperature of the room atmosphere which many times is lower than the temperature of the working mechanism within the pump. Under such conditions the clearance normally provided between the flat surfaces on the shift ring and the flat surfaces on the pump housing is reduced to an extent that the surfaces bind. Also, as the pump is used the surfaces tend to wear and thereby produces play between the surfaces on the shift ring and the housing so that the torque reaction produced by the pump mechanism will cause the surfaces on the shift ring to cock with respect to the surfaces on the housing and again produce a binding action.

It is, therefore, an object of this invention to provide a means for mounting the shift ring of a fluid pump that will provide less frictional resistance to the movement of the shift ring and will maintain the accuracy of clearance between the various parts over prolonged periods of use.

An object of the invention is to provide a radial pump unit having the shift ring thereof mounted on journals for decreasing the frictional resistance to movement of the shift ring.

Another object of the invention is to provide a means for mounting the shift ring of a variable delivery fluid pump wherein the clearance between the mounting means on the shift ring and the means on the pump housing can be increased without losing any accuracy of control over the movement of the shift ring, whereby expansion of the shift ring mounting means due to temperature differential between the mounting means and the housing of the pump will not effect the freedom of action between the shift ring and the pump housing.

Another object of the invention is to provide a variable delivery pump particularly of the radial type wherein the shift ring is mounted upon journals to permit freedom of movement of the shift ring axially of the journal and wherein the drive shaft or spindle of the rotor of the pump provides means to prevent rotation of the shift ring, or pump unit upon the journals.

Further objects and advantages will become apparent from the drawings and the following description.

In the drawings:

Fig. 3 is a transverse cross-sectional view of the journal mounting for the shift ring taken along line 3—3 of Fig. 1.

Figure 1:
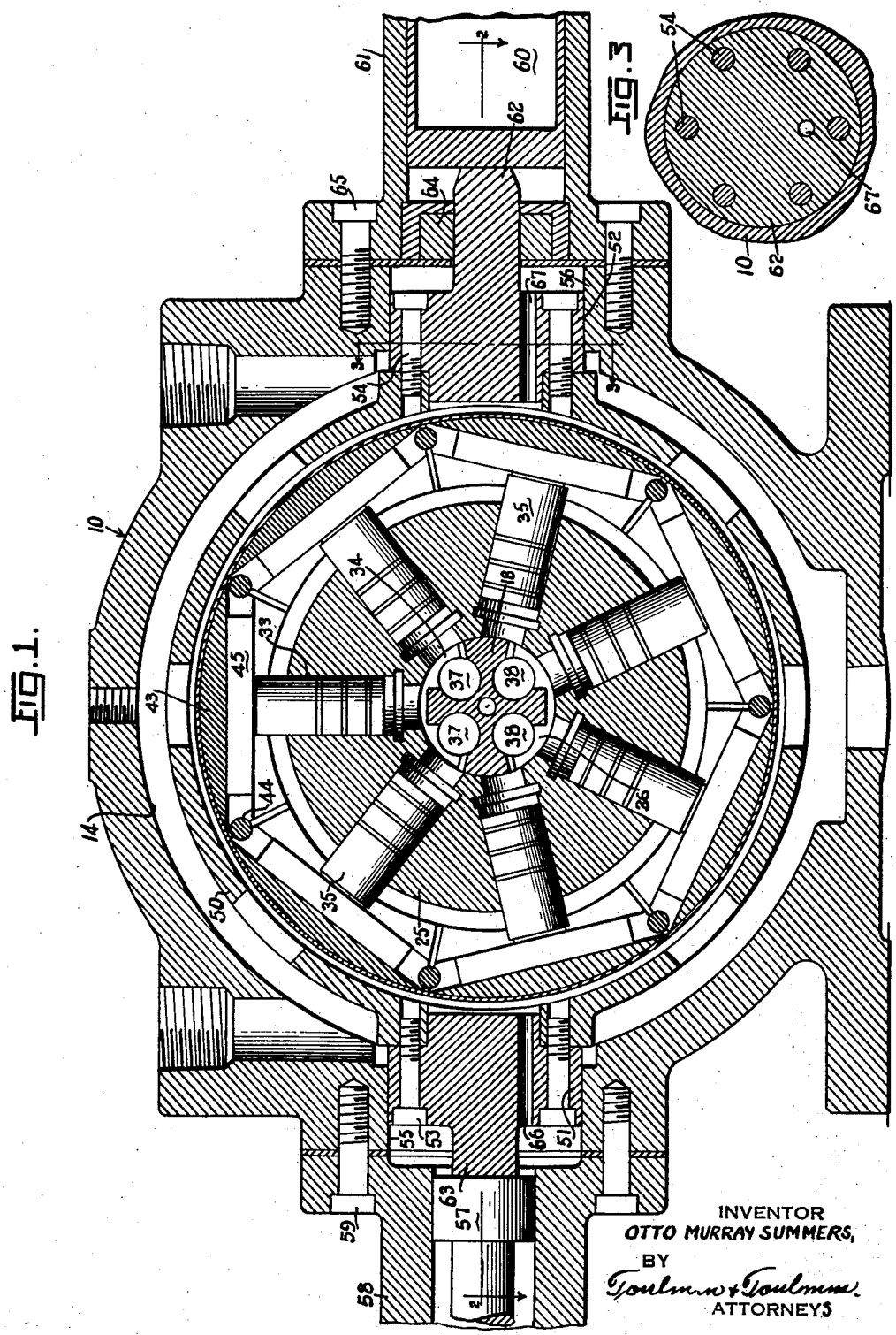
Fig. 1 is a vertical cross-sectional view of a fluid pump embodying features of this invention taken substantially along line 1—1 of Fig. 2.
Figure 2:
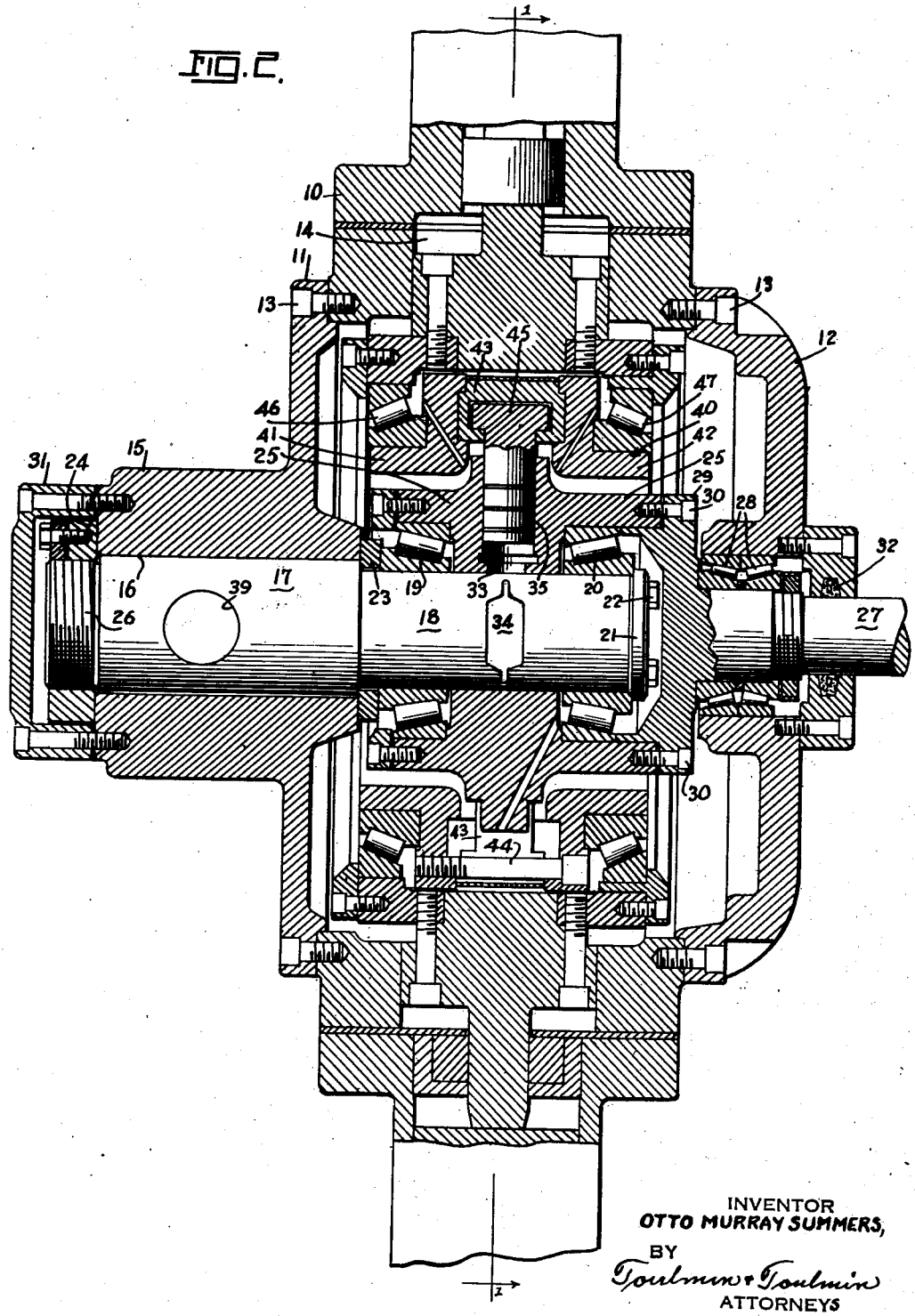
Fig. 2 is a horizontal cross-sectional view of a pump embodying features of this invention taken substantially along line 2—2 of Fig. 1.

The pump of this invention consists of a substantially cylindrical casing 10 that has end walls 11 and 12 secured thereto by means such as the bolts 13. The casing 10 is provided with a hollow interior 14 that receives the pump mechanism hereinafter described.

The end wall 11 is provided with a boss 15 that has an internal bore 16 adapted to receive the valve spindle 17. The valve spindle 17 has a reduced diameter portion 18 that receives the tapered roller bearings 19 and 20 for supporting a primary rotor 25. The tapered roller bearings 19 and 20 are preloaded between an end cap 21 secured to the end of the spindle portion 18 by means of the bolts 22 and a ring 23 positioned against the inner surface of the boss 15 in the end plate 11. An adjusting nut 24 is threaded upon the threaded portion 26 of the valve spindle 17 for adjusting the tapered roller bearings 19 and 20 to preload the same and maintain substantially zero clearance between the primary rotor 25 and the spindle portion 18.

A drive shaft 27 is bearinged in the end wall 12 by means of a pair of tapered roller bearings 28, the drive shaft having an inner spider or flange 29 that is bolted to the primary rotor 25 by means of bolts 30. An end cap 31 encloses the adjusting nut 24 and a shaft seal 32 is provided around the drive shaft 27.

The primary rotor 25 has a plurality of radially disposed cylinder bores 33 in which the pistons 35 are adapted to reciprocate. The cylinder bores 33 communicate with arcuate valve passages 34 and 36 alternately provided in the spindle portion 18 that communicate with passages 37 and 38, respectively, for delivering fluid to and discharging fluid from the various cylinder bores 33. The valve spindle 17 is provided with suitable passages, one of which is shown at 39 for connecting the passages 37 and 38 with suitable inlet and discharge passages, not shown, in the boss 15 for the end plate 11.

The cylinders 35 drive a secondary rotor 40 which consists of end plates 41 and 42 that are retained in spaced relationship by means of the crosshead thrust guide blocks 43, bolts 44 extending between the side plates 41 and 42 to maintain the assembled relationship of the elements. The cylinders 35 are each provided with a shoe 45 that engages one of the guide blocks 43, whereby the secondary rotor 40 is driven by the cylinders 35.

The secondary rotor 40 is supported within a shift ring 50 by means of the tapered roller bearings 46 and 47, whereby the secondary rotor 40 can rotate within the shift ring 50. The shift ring 50 carries journals 51 and 52 secured to the shift ring by means of bolts 53 and 54, respectively. The journals 51 and 52 are slidably disposed in bores 55 and 56, respectively, provided in diametrically opposite walls of the casing 10. The bores 55 and 56 are preferably cylindrical in shape as shown in Figures 1 and 3. The bores 55 and 56 for the journals 51 and 52 can be produced in the casing 10 either by separate operations to accurately align the bores 55 and 56, or by a continuous operation that proceeds through both bores 55 and 56 to insure their axial alignment. The journals 51 and 52 support the shift ring within the casing 10 and absorb the torsional reaction produced within the pump by means of the radially operated pistons regardless of the eccentric position of the shift ring with respect to the primary rotor. The journals 51 and 52 provide a supporting means for the shift ring 50 that has a relatively long surface of contact to minimize wear at any particular point. Also, the use of journals 51 and 52 within the bores 55 and 56 provides means whereby the clearance between the moving part on the shift ring and the stationary part on the casing 10 can be more accurately maintained. It is much easier to maintain the diameter of a bore accurate than it is to maintain parallelism between flat surfaces that are a substantial distance from one another such as often occurred in pumps of large capacity. Again, when the shift ring of a radial type pump is mounted on journals as disclosed in this invention, the clearance between the journal and its supporting bore can be greater than that which was formerly provided between the flat surface of the shift ring and the flat surface on the casing of the pump because there is a greater surface area of the journal that will support the shift ring. If there was any substantial clearance provided between the flat supporting surfaces of the shift ring and the flat surfaces on the casing of the former pumps there would be a substantial binding between the surfaces that prevented smooth operation of the shift ring. In effect the former flat surfaces produced merely a line contact for the shift ring when the clearance between the surfaces was sufficient to permit complete freedom of action over all conditions when the surfaces cocked with respect to one another.

The journals of this invention will permit the use of relatively small clearances between the journal and its mounting bore and yet prevent binding between the journal and the bore due to expansion of the journal upon a temperature increase of the pumping mechanism, the small journals expanding considerably less than the expansion of the shift ring as formerly arranged. Therefore, the invention provides greater freedom of action between the shift ring and the supporting casing for the same to produce a smoother operation of the shift ring by control mechanisms that are connected thereto.

An extension 63 on the journal 51 engages the control member 57 that is slidably disposed in a casing member 58 provided for the control member 57. The casing 58 is secured to the casing 10 by means of bolts 59.

The control member 60 is slidably disposed in a casing 61 and engages an extension 62 provided on the journal 52. The extension 62 passes through an oil seal 64. The casing 61 is secured to the pump casing 10 by means of bolts 65.

The control members 57 and 60 may be operated in any suitable fashion to change the position of the shift ring 50 with respect to the primary rotor 25. In some instances the control member 60 may be spring pressed to urge the shift ring 50 toward full stroke position and the control member 57 can be manually or automatically operated to oppose the control member 60 to shift the ring 50 toward neutral position, or the control member 60 can move the shift ring 50 past neutral to the opposite eccentricity with respect to the primary rotor 25 and thereby reverse the delivery from the pump.

The journals 51 and 52 reciprocating in their bores 55 and 56 would have a tendency to trap fluid that leaks behind the journals. To prevent any trapping of fluid behind the journals 51 and 52 they are provided with passages 66 and 67 that permit escape of fluid into the interior of the shift ring 50.

While the form of the apparatus disclosed and described herein constitutes a preferred form, yet, it is to be understood that the use of journals for supporting a shift ring is not limited to the type of pump disclosed herein, the actual construction of the pumping mechanism being disclosed as one of a number of types of radial pumps that use a shift ring for changing the eccentricity of the pump members for changing the volume delivery of the pump.

The journals 51 and 52 are preferably circular in form since this is the easiest type of structure to produce. Since they are circular in form, the shift ring 50 could rotate upon the journals. However, the valve spindle 17 and the drive shaft 27 prevent such rotation of the primary and secondary rotors and the shift ring 50 upon the journals.

While the pump unit disclosed and described in this invention constitutes a preferred form, yet the structure is capable of substantial mechanical alteration without departing from the spirit of the invention, and all such modifications as fall within the scope of the appended claims are intended to be included herein.

Having thus fully described my invention what I claim as new and desire to secure by Letters Patent is:

1. In a variable delivery pump of the type described, a casing having a chamber, variable delivery pumping mechanism in said chamber, including a primary rotor, means journalling said primary rotor for rotation about a first axis, a secondary rotor, a shift ring rotatably supporting said secondary rotor on a second axis parallel to said first axis, reciprocable pumping elements extending between said rotors, and means mounting said ring for shifting along a third axis lying in the plane of said ring and normal to said first and second axes, said means comprising aligned journals extending from opposite sides of said ring, each journal slidably fitting a corresponding bore in said casing whereby the separation of said first and second axes may be varied, said journals constituting the sole means for supporting said ring and secondary rotor.

2. In a variable delivery pump of the type described, a casing having a chamber, variable delivery pumping mechanism including a primary rotor, means journalling said primary rotor within said chamber for rotation about a first axis, a secondary rotor, a shift ring rotatably supporting said secondary rotor within said chamber on a second axis parallel to said first axis, reciprocable pumping elements extending between said rotors, and means mounting said ring for shifting along a third axis lying in the plane of said ring and normal to said first and second axes, said means comprising aligned journals extending from opposite sides of said ring, each journal slidably fitting a corresponding bearing surface on said casing whereby the separation of said first and second axes may be varied, said journals constituting the sole means for supporting and shifting said ring and secondary rotor.

3. In a variable delivery pump of the type described, a casing having a chamber, variable delivery pumping mechanism in said chamber, including a primary rotor, means journalling said rotor within said chamber for rotation on a first axis, a secondary rotor, a shift ring journalling said secondary rotor within said casing for rotation about a second axis parallel to said first axis, said secondary rotor surrounding said primary rotor, radially reciprocable pumping elements between said rotors, and means mounting said ring in a plane normal to said axes and for translation along a shift axis lying in said plane, said means comprising journals on said ring aligned on and along said axis, each journal slidably fitting corresponding bearings on said casing, said means constituting the sole support and shifting means for said ring and secondary rotor.

OTTO M. SUMMERS.